Patented Jan. 5, 1943

2,307,625

UNITED STATES PATENT OFFICE 2,307,625

CHEMICAL PROCESS FOR DEZINCKING GALVANIZED SCRAP

John E. Gregory, Lakewood, Ohio, assignor to E. I. du Pont de Nemours & Company, Wilmington, Del., a corporation of Delaware No Drawing. Application December 19, 1939, Serial No. 309,963

3 Claims. (Cl. 23—97)

This invention relates to dezincking galvanized scrap and particularly to the recovery of the zinc value as zinc chloride and the iron value as black scrap.

In the dezincking of galvanized scrap and the recovery of the zinc value as zinc chloride it has been customary in the past to carry out the process in two principal steps. The first of these may be considered the dezincking operation proper in which the zinc coating is reacted with hydrochloric acid to form zinc chloride, and the second may be considered as a boiling operation in which the zinc chloride solution obtained from the dezincking operation is boiled in the presence of galvanized scrap, primarily to effect reduction and deposition of iron from the zinc chloride liquor and, secondarily, to concentrate the zinc chloride liquor and to adjust basicity thereof. To effect the primary object of the boiling operation, however, required that essentially all the galvanized scrap be initially put through this operation, for unless large quantities of scrap were thus treated the iron pick-up in the boiling operation more than offset the reduction and deposition of iron by the zinc. Since the partially dezincked scrap had to be transferred from the boiling operation to the dezincking operation, either by mechanical devices or by hand, it was necessary to handle the scrap twice prior to baling. Thus, the scrap was handled first in charging the boiling operation and again in transferring the partially dezincked scrap to the dezincking operation. Since the amount of zinc on such scrap does not average much more than five or six per cent, a not inconsiderable proportion of the cost of the process was attributable merely to handling of the scrap. These and other disadvantages characterized the processes of the prior art.

The present invention avoids these disadvantages by so regulating and controlling the iron pick-up in the dezincking operation that the primary function of galvanized scrap in the boiling operation, that is, of reducing and depositing iron, is substantially eliminated whereby, since galvanized scrap is required in the boiling operation primarily for what has been described above as secondary functions, namely, that of adjusting the basicity of the zinc chloride liquor, it is necessary in the processes of this invention to introduce only a relatively small proportion of the galvanized scrap in the boiling operation. For example, whereas in the prior art it had been necessary to introduce 125,000 pounds of galvanized scrap in the boiling operation, it is possible by the processes of my invention to introduce 120,000 pounds of the scrap directly to the dezincking operation and only 5,000 pounds to the boiling operation.

In carrying out the processes of my invention the galvanized scrap is charged into a tank and covered with dezincking solution. The dezincking solution is a strong zinc chloride solution which is obtained from the dezincking operation, as will be more particularly pointed out hereinafter. Weak zinc chloride solutions as obtained from washing the dezincked scrap are also introduced into the dezincking tank. With the scrap covered with dezincking solution aqueous hydrochloric acid of suitable strength is added to the tank in an amount approximating the calculated equivalent of the zinc, the calculations being only approximate in view of the variable nature of the zinc and because too little or too much acid may be compensated for later by the addition of scrap or acid as required. When the dezincking operation is complete the solution is usually neutral or slightly basic.

It is essential to the operation of my processes that the dezincking operation be so carried out that the iron pick-up shall not substantially exceed 1.25 per cent. That is to say, the iron content of the dezincking solution should not be allowed to become greater than about 1.25 per cent. If too much acid were added to the dezincking solution and the dezincking operation were continued too long, excessive iron pick-up would result. Control over the iron pick-up may be effected in a number of ways, but is best effected by having present in the liquor thruout the dezincking operation a substance which retards or inhibits iron pick-up. Zinc is such a substance, since it is well known that in iron-zinc couples the zinc corrodes or dissolves in preference to the iron and has a protective action. I have found that this phenomenon may be satisfactorily used to inhibit iron pick-up during the dezincking operation, and it is only necessary to add insufficient quantity of hydrochloric acid to the dezincking solution to dissolve all the zinc from the galvanized scrap or to interrupt the dezincking operation before the scrap is fully dezincked. Either, however, requires that the scrap be discharged with considerable zinc yet undissolved, and while the amount is negligible from an economic point of view it is nevertheless undesirable if black scrap is desired as a by-product. Black scrap, that is, wholly dezincked scrap, is suitable for metallurgical purposes, and even traces of zinc in such cases are objectionable.

I have found that these disadvantages may be avoided by effecting the dezincking operation in the presence of an organic acid-inhibitor. Acid inhibitors, well known in the art of pickling of metals and other arts, such as diorthotolylthiourea, sulfurized quinoidine, mercaptobenzothiazole, and numerous others are suitable, and, notwithstanding the high concentrations of zinc chloride in the dezincking solution, operate effectively to keep the iron pick-up well below 1.25 per cent. In this manner I have been able to restrict iron pick-up to 0.6 per cent or less and yet to obtain a completely dezincked scrap suitable for metallurgical purposes.

In a typical operation the dezincking tank is charged with about 12 to 15 thousand pounds of galvanized scrap containing about 5 to 6 per cent zinc. Dezincking solution is pumped into the tank until the galvanized scrap is covered. An approximate analysis of the dezincking solution is—gravity 35° Baumé, zinc chloride 32%, iron 0.6%. Weak liquor having a gravity of about 15–17° Baumé and a zinc chloride content of about 13% is also added. The weak liquor represents the accumulated washings of the entire process and, since the first washings are made with this weak liquor, it is only the surplus or the make during the previous run which is added to the dezincking tank. Both the dezincking solution and the weak liquor are what are known in the art as in-process solutions. Thus, sufficient dezincking solution is always maintained on hand completely to cover each batch of scrap charged into the dezincking tank and sufficient weak liquor is always maintained in reserve to provide wash liquor for the first washing. As a result the concentration of the dezincking solution is governed entirely by the amount of water introduced into the weak liquor supply by the second washing. Thus, with 20° Baumé hydrochloric acid the maximum strength of dezincking solution theoretically obtainable would be about 42° Baumé if no water were added to the process, whereas in actual practice the actual strength of the dezincking solution varies from about 30 to about 40° Baumé and for efficient operation should not contain substantially less than 25 per cent zinc chloride.

Commercial hydrochloric acid of gravity at 20° Baumé and containing about 31% HCl is then introduced into the dezincking tank. To this commercial hydrochloric acid is previously added about 0.05% of a commercial inhibitor the active principle of which is a diorthotolylthiourea. Slightly more acid is added than is necessary to dissolve the estimated amount of zinc on the galvanized scrap. While the dezincking is proceeding the solution is pumped out of the tank and back in again in order to obtain a mixing action. Acidity of the solution is checked and more acid is added if required. The temperature obtained due to the heat of reaction while dezincking is going on is about 150–175° F. The scrap is allowed to remain immersed until thorough zinc removal has been effected as determined by visual observation. About 45 minutes is usually required. When dezincking is complete the solution is usually neutral or slightly basic and has an analysis approximating that of the dezincking solution originally charged into the dezincking tank due to the fact, as already pointed out, that the concentration of the dezincking solution is governed by the amount of water introduced into the process as the wash liquor.

When the dezincking operation is completed the dezincked solution is drawn off and the tank is flooded with weak solution thereby to wash out and recover as much as possible of the dezincking solution retained in the scrap. After this weak liquor is removed from the tank the dezincked scrap is given a final washing with a minimum quantity of water, and the wash water is transferred to the weak liquor supply. As this weak liquor is built up the surplus is introduced into the dezincking operation as already explained.

The dezincking operation is repeated as many times as required to build up the required reserves of dezincking solution and weak liquor. It may be necessary in starting up the operation to use small charges at first, gradually increasing them as the supply of dezincking solution and weak liquor is built up.

When more dezincking solution is on hand than is required completely to recover the galvanized scrap charged in the dezincking tank the surplus is passed on to the boiling operation. Here the surplus dezincking solution is boiled in the presence of galvanized scrap until it has a basicity expressed as ZnO approximating the iron content. At the same time the solution is concentrated to a gravity of about 53 or 54° Baumé. The iron content may be slightly reduced due to reduction and deposition of iron by the zinc, but as a rule when expressed as per cent it will be slightly greater than in the dezincking solution because of the evaporation of water. A typical concentrated solution has a zinc chloride content of about 52%, an iron content of about 0.8%, and a basicity expressed as ZnO of about 1%.

When about four batches of dezincking solution have been boiled with one batch of scrap the scrap still is not completely dezincked, but the rate at which zinc can be removed from it will no longer serve readily to raise the basicity as required. This partially dezincked scrap may be sent back to the dezincking operation for complete stripping. Since it is unnecessary in the processes of my invention to effect any substantial iron reduction in the boiling operation the amount of partially dezincked scrap required to be transferred to the dezincking operation constitutes only a minor proportion of the galvanized scrap processed. Thus, in the processes of my invention it is seldom necessary that more than about 4 or 5 per cent of the total scrap processed need be passed through the boiling operation, and it is only when the iron content of the dezincking solution is allowed to become high, as for example around about 1 per cent or more, that any significant quantity of scrap need be passed through the boiling operation. Even so, it will seldom be necessary to increase more than about 10% of the total galvanized scrap to obtain the desired iron content of less than 1 per cent in the concentrated solution.

The concentrated solution obtained from the boiling operation may be treated in any suitable manner to remove impurities, such as iron and sulfate. Iron, for example, may be removed by oxidizing it to the ferric state and allowing the precipitated ferric hydroxide to settle out. The boiling operation conditions the concentrated solution for this treatment in that the concentrated solution is made sufficiently basic in the boiling operation that ferric iron separates out as ferric hydroxide. Sodium chlorate is used as the oxidizing agent and the surplus chlorate may be removed by treating the solution with zinc dust.

I claim:

1. In a process for dezincking galvanized scrap in which zinc is stripped from the scrap by means of an acid solution of zinc chloride, the method which comprises covering the scrap with a substantially neutral solution of zinc chloride, adding sufficient hydrochloric acid to dissolve at least a substantial portion of the zinc and to leave when the dezincking is discontinued a substantially neutral solution, discontinuing the dezincking while the iron pick-up is less than about 1.25 per cent, dividing the substantially neutral solution thus obtained into two portions, reserving one portion for another dezincking operation and boiling the other portion in the presence of fresh galvanized scrap in order to increase the basicity until the basicity expressed as ZnO is substantially equivalent to the iron content.

2. In a process for dezincking galvanized scrap in which zinc is stripped from the scrap by means of an acid solution of zinc chloride, the method which comprises covering the scrap with a substantially neutral solution of zinc chloride, adding sufficient hydrochloric acid to dissolve at least a substantial portion of the zinc and to leave when the dezincking is discontinued a substantially neutral solution, discontinuing the dezincking while the iron pick-up is less than about 1.25 per cent, dividing the substantially neutral solution thus obtained into two portions, reserving one portion for another dezincking operation, boiling the other portion in the presence of fresh galvanized scrap to increase the basicity sufficiently that ferric iron may be separated out as ferric hydroxide, treating the solution thus obtained with an oxidizing agent to oxidize ferrous iron to ferric iron, and separating out the ferric hydroxide formed.

3. In a process for dezincking galvanized scrap the method of which comprises covering the galvanized scrap with the substantially neutral product of the dezincking of a previous operation, adding sufficient hydrochloric acid to dissolve the zinc and to leave as a product a substantially neutral solution, maintaining in the dezincking solution throughout the dezincking operation a substance capable of inhibiting the attack of hydrochloric acid upon iron in an amount sufficient to restrict iron pick-up to less than about 1.25 per cent, separating the spent scrap from the dezincking solution and boiling a portion of the solution thus obtained in the presence of metallic zinc to increase the basicity expressed as ZnO to the substantial equivalent of the iron content whereby to provide a basicity sufficient to precipitate ferric iron as ferric hydroxide.

JOHN E. GREGORY.